E. H. J. LORENZ.
READING DEVICE FOR TEST BOTTLES.
APPLICATION FILED OCT. 20, 1919.
1,366,397. Patented Jan. 25, 1921.
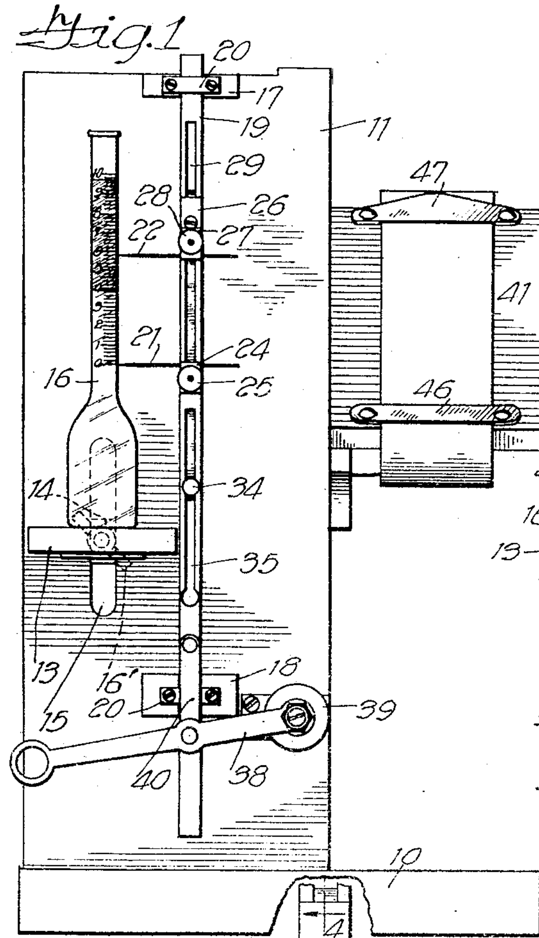
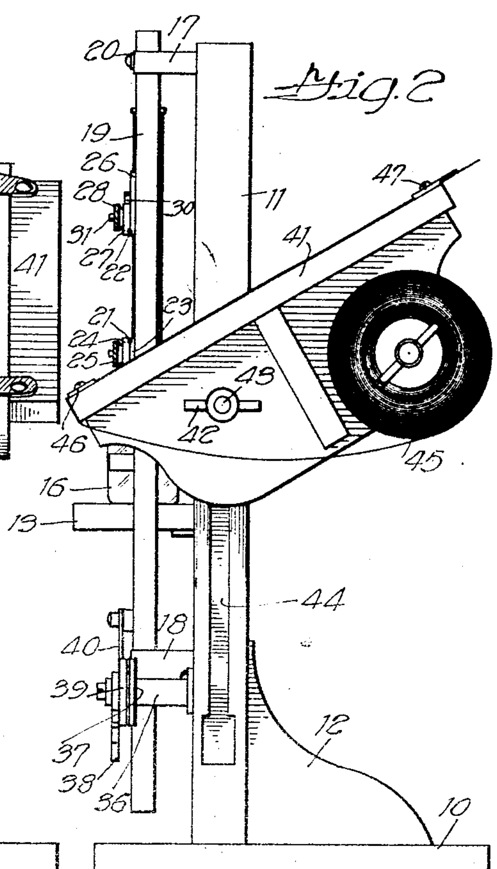
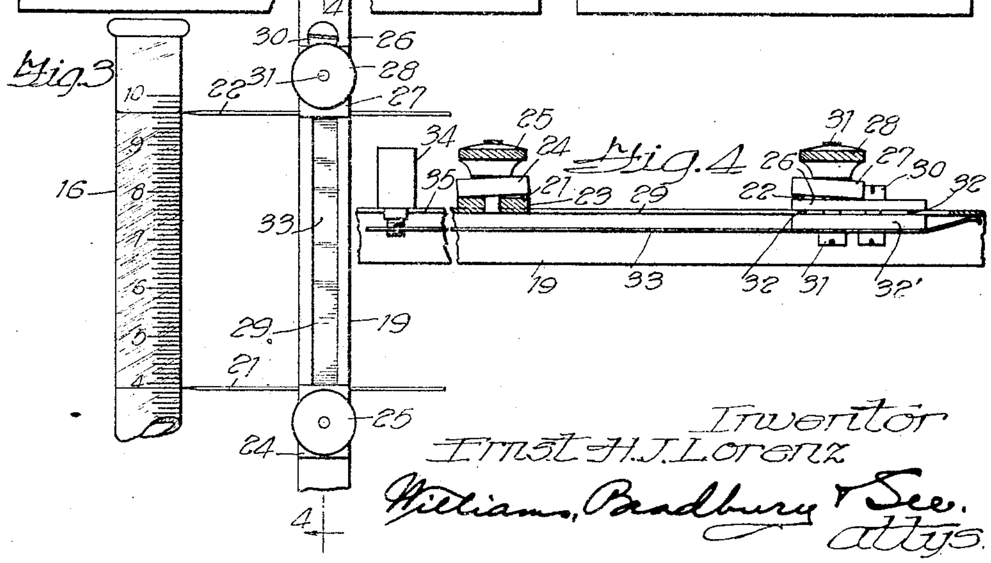

UNITED STATES PATENT OFFICE.

ERNST H. J. LORENZ, OF MADISON, WISCONSIN, ASSIGNOR TO J. H. HARRIS, GEORGE B. HARRIS, GEORGE D. PUFFER, AND JAMES L. HARRIS, ALL OF ELKHORN, WISCONSIN, A COPARTNERSHIP.

READING DEVICE FOR TEST-BOTTLES.

1,366,397. Specification of Letters Patent. Patented Jan. 25, 1921.

Application filed October 20, 1919. Serial No. 332,091.

*To all whom it may concern:*

Be it known that I, Ernst H. J. Lorenz, a citizen of the United States, residing at Madison, in the county of Dane and State of Wisconsin, have invented a certain new and useful Improvement in Reading Devices for Test-Bottles, of which the following is a full, clear, concise, and exact description, reference being had to the accompanying drawings, forming a part of this specification.

My invention relates to a device to be used in reading the indications of test bottles such as are employed in determining the percentages of butter fat in milk and cream, and the object of my invention is to provide a device of this class that is of simple and rugged construction that may be economically manufactured and one that may be quickly manipulated, preferably being capable of operation by one hand of the operator.

As is well known the percentages of butter fat in milk and cream are usually determined by placing a sample of the milk or cream under test into a glass test bottle having a comparatively small body portion and a long narrow neck which is usually provided with a vertical scale graduated in percentages of butter fat. After being placed in the bottle, as aforesaid, the milk or cream is subjected to the centrifugal, or other well known process, to cause its fatty content to separate out of its other constituents and to assume a position in the long graduated neck of the bottle. The percentage of butter fat is determined by measuring the distance between the upper and lower extremities of the butter fat, and by comparing this distance with the scale on the bottle neck. It is this matter of comparison which in the past has been difficult to make and which has been the source of considerable error in ascertaining the readings of such test bottles.

The difficulty arises because the lower extremity of the butter fat in practice never falls exactly opposite the zero mark on the bottle scale (assuming that the bottle used is provided with upwardly increasing graduations). My invention makes it possible by a simple operation accurately to use the bottle graduations to read the butter fat percentages regardless of the position of the butter fat extremities with respect to the bottle graduations.

As my invention will perhaps be best understood when the description thereof is read in connection with the drawings illustrating the same, I shall proceed to set forth the description to follow, wherein reference is made to the accompanying drawings, in which—

Figure 1 is a front elevational view of the device embodying my invention;

Fig. 2 is a side elevational view thereof;

Fig. 3 is a fragmentary elevational view illustrating the needles or pointers in the positions in which they are placed before actuating the sliding bar to carry the lower needle or pointer to the zero line as will be presently explained; and Fig. 4 is a fragmentary sectional view taken on line 4—4 of Fig. 3.

Similar characters of reference refer to similar parts throughout the several views.

The device herein shown comprises a base 10 whereon is mounted a vertically disposed board or plate 11 which is conveniently braced by the bracket 12. These parts are conveniently constructed of wood, but of course may be made of any other suitable material.

Projecting from the forward side of the board 11 is a horizontal shelf 13 which I have shown as being provided with a block 14 arranged to be secured at any position along the slot 15 by a wing nut 16′, which of course coöperates with a stud bolt projecting rearwardly from the block 14. By virtue of this arrangement it is possible vertically to adjust and secure the horizontal shelf at a plurality of positions with respect to the plate or board 11. I may say at this point that the shelf 13 may be permanently fixed in position if desired. There is, however, some advantage in having the adjustable shelf when the device of my invention is to be used with test bottles differing in dimensions. Disposed on the shelf 13 I have shown a Babcock milk test bottle 16 provided with the usual long narrow neck having scale markings thereon, as shown. The shading appearing on the bottle neck in Figs. 1 and 3 illustrates the position assumed by the butter fat after it has been separated out of the other constituents of the milk or cream as hereinbefore explained.

Carried by the board or plate 11 are the upper and lower blocks 17 and 18 which provide guides or bearings for a bar 19 which is adapted for reciprocation in a vertical line. Plates 20, 20 retain the bar 19 in the recesses formed for the reception of the bar in the said guide blocks 17 and 18. It will be noted that the bar 19 is a channel, or in other words of substantially U-shaped cross-section with its parallel walls extending toward the board or plate 11. Said bar is disposed at right angles to the upper surface of the shelf 13 and consequently is disposed parallel with the axis of the milk test bottle placed on said shelf.

Carried by the bar 19 are the needles 21 and 22 which are parallel with each other and project laterally from the bar 19 so that their pointed ends lie adjacent the scale markings on the neck of the test bottle supported by shelf 13. The needle 21 is fixed with respect to the bar 19 and after being secured in operative position it is incapable of movement independently of said bar, whereas the needle 22 may be adjusted with respect to the bar as will presently be explained.

It will be noted that the fixed needle 21 is disposed in a transverse groove formed in the small plate 23 which is welded or otherwise suitably attached to the bar 19, the said needle being retained in position by a clamping plate 24 and a thumb nut 25, as is most clearly shown in Fig. 4.

The adjustable needle 22 is disposed in a transverse groove in a plate 26 which is adjustable with respect to bar 19, said needle being retained in position by clamping plate 27 and nut 28, as shown in Fig. 4. The longitudinal slot 29 is formed in the upper portion of the bar 19 and extending through the slot are screws 30 and 31 which connect plate 26 with a plate 32′ lying within the channel bar. Suitable lugs 32, 32 projecting from the inner face of the plate 26 and engaging the adjacent face of the plate 31 prevent the screws 30 and 31 from being tightened up to such an extent that the plates 26 and 32′ will not slide with respect to the channel bar 19. Attached near its upper end to the plate 32′ is a flat spring 33 the upper extremity of which is turned toward the front wall of the channel bar and braced thereagainst frictionally to retain the sliding plates 26 and 32′ in any position in which they may be placed.

The lower end of the spring 33 is attached to an operating button 34 which extends through a longitudinal slot 35 formed in the front wall of the bar 19 below the fixed needle 21. It will thus be seen that by manipulating the button 34 the adjustable needle 22 may be placed and retained in a plurality of positions along the bar 19.

Projecting outwardly from the plate 11 at a point adjacent the lower end of the bar 19 is a stud 36 provided at its outer end with a disk 37. Pivoted to the stud is one end of a lever 38, the pivoted end of which is provided with a disk 39 which lies flush with the disk 37. The purpose of this construction is to insure sufficient friction at the point where the lever 38 is pivoted in order that the lever and parts connected therewith will stay at any point in which they are placed by operating the lever. If desired, a suitable washer may be placed between disks 37 and 39, as shown. Attached to lever 38 near its central point is one end of a link 40, the other end of which is pivoted to the bar 19.

In using the device just described the lever 38 is manipulated to raise or lower the bar 19 as may be required to cause the point of the fixed needle 21 to lie directly opposite the lower extremity of the butter fat, as is clearly illustrated in Fig. 3. The button 34 is then manipulated to cause the point of adjustable needle 22 to lie directly opposite the upper extremity of the butter fat, as is also shown in Fig. 3. Now, by a quick movement the lever 38 may be depressed to cause the bar and both the needles carried thereby to travel downwardly until the fixed needle 21 lies opposite the zero graduation on the needle. The percentage of butter fat may now be read directly opposite the needle 22.

It will be noted that all of the operations just described, including the placing of the test bottle on the shelf 13, may be performed by the operator with his left hand, leaving his right hand free to make notations upon a memorandum slip carried on the writing shelf 41 carried on the right-hand side of the plate 11. This writing shelf is preferably secured in position by wing nut 42 and bolt 43, the head of the latter being arranged to coöperate with an undercut groove 44 formed in the edge of the plate 11 so that said shelf may be adjusted with respect to board 11, both as to its vertical position and as to inclination. The desired note paper may be carried on a supply roll 45 and carried up over the upper surface of the shelf and under a guide plate 46 and a tearing plate 47. In view of the fact that it is important that this reading of the milk test bottles be accomplished rapidly, there is a decided advantage in having apparatus so constructed that it may be operated by the operator with one hand while his other hand is free for the purpose of making notations as to the readings noted, etc.

While I have described one embodiment of my invention in considerable detail, I do not limit myself to this specific construction but claim all similar constructions falling within the scope of the appended claims.

What I claim as new is:

1. In a device of the class described, comprising a vertically disposed supporting board, a horizontal shelf projecting from one face of said board, said shelf arranged to support a test bottle, upper and lower bearings carried by the supporting board, a bar disposed in said bearings and shiftable in a line parallel to the axis of a bottle carried by said shelf, a fixed pointer projecting laterally from said bar, a second pointer projecting laterally from said bar, means for adjusting said second pointer along said bar, a lever having one end thereof pivoted to said supporting board, and a link connected with said lever and said bar, whereby by a single movement of said lever said arm may be shifted vertically to change the position of said pointers with respect to the bottle without changing the distance between said pointers.

2. A device of the class described, comprising a supporting board provided with upper and lower bearings, a shelf adapted to support a test bottle, a bar substantially U-shaped in cross-section disposed in said bearings and vertically adjustable therein, a fixed needle projecting laterally from said bar, a needle support slidable on said bar, a needle carried thereby, a flat spring between the parallel walls of said U-shaped bar arranged frictionally to hold said needle support in any position to which it may be adjusted, and means for shifting both of said needles in respect to the test bottle without changing the distance between said needles.

3. A device of the class described, comprising in combination with a vertically disposed supporting board a shelf projecting from said supporting board adapted to carry a test bottle, a vertically disposed bar carried by said supporting board, a pointer carried by said bar, an adjustable pointer carried by said bar, means for moving said adjustable pointer with respect to said bar, a writing shelf carried at one side of said supporting board, and means to shift said bar and the pointers carried thereby in a line parallel to the axis of the test bottle, said last mentioned means comprising a lever having one end pivoted to the supporting board and its free end projecting away from the writing shelf, together with a link connecting said lever with said bar.

4. In a device of the class described, comprising a vertically disposed supporting board, a horizontal shelf projecting from one face of said board, said shelf arranged to support a test bottle, upper and lower bearings carried by the supporting board, a bar disposed in said bearings and shiftable in a line parallel to the axis of a bottle carried by said shelf, a fixed pointer projecting laterally from said bar, a second pointer projecting laterally from said bar, means for adjusting said second pointer along said bar, a lever having one end thereof pivoted to said supporting board whereby by a single movement of said lever said arm may be shifted vertically to change the position of said pointers with respect to the bottle without changing the distance between said pointers.

5. A device of the class described comprising a supporting member, a horizontal shelf supported thereby, said shelf arranged to support a test bottle, a bar disposed adjacent said supporting member, and shiftable in a line parallel to the axis of a bottle carried by said shelf, a pair of pointers projecting laterally from said bar, a pivoted lever connected to said pointers whereby upon a single movement of said lever said arm may be shifted vertically to change the position of said pointers with respect to the bottle without changing the distance between said pointers.

In witness whereof, I hereunto subscribe my name this 24 day of September, 1919.

ERNST H. J. LORENZ.

Witnesses:

E. A. EVERETT,

W. W. HOPKINS.